United States Patent

[11] 3,632,968

[72] Inventor Robert G. Wilson
 643 E. Faris Road, Greenville, S.C. 29607
[21] Appl. No. 97,487
[22] Filed Dec. 14, 1970
[45] Patented Jan. 4, 1972

[54] SELF-SERVICE FOOD WARMER ASSEMBLY
 5 Claims, 3 Drawing Figs.

[52] U.S. Cl. ................................................. 219/214,
 99/339, 99/448, 312/236
[51] Int. Cl. ..................................................... H05b 1/00
[50] Field of Search .......................................... 219/214,
 218, 454, 457–459, 465; 312/114, 236; 99/339,
 448; 222/146; 186/1

[56] References Cited
 UNITED STATES PATENTS
 3,170,541 2/1965 Werner .......................... 312/236 X
 3,327,092 6/1967 Wilson .......................... 219/214
 3,120,599 2/1964 Hilgers .......................... 219/214 X

*Primary Examiner*—C. L. Albritton
*Attorney*—Bailey and Dority

ABSTRACT: A self-service food warmer includes a plurality of vertically spaced elongated horizontal trays provided with means for fixing end portions of the trays to spaced vertical standards carried by a quick-recovery oven, and heating means are carried within the trays for providing uniformly heated surfaces thereof, with electrical connections extending through the means fixing the end portions of the trays for supplying electrical energy to the heating means, and a top as well as a partial closure means are provided.

INVENTOR.
ROBERT G. WILSON
BY Bailey & Dority
ATTORNEYS.

SELF-SERVICE FOOD WARMER ASSEMBLY

This invention relates to a self-service food warmer wherein ready access is provided to edibles displayed upon the trays.

The problem of attractively displaying edibles, while at the same time keeping them hot has received considerable attention by those supplying equipment to the food stores and the like. The disclosure of U.S. Pat. No. 3,327,092 issued June 20, 1967 to the present inventor is an example of equipment of this type presently available. It is desirable to provide in a single unit means for quickly heating frozen cooked foods and then attractively displaying them, while maintaining the heat for self-service by customers. Earlier devices, while filling a need and performing adequately for their intended purposes, have deficiencies in one or more of the areas mentioned above. For example, the patented device referred to above provides limited display of the articles and requires a customer to open the glass doors in order to purchase an article. This requirement does not invite ready placing of the edible from the display container into the grocery cart. Moreover, the lower housing is merely a storage warmer and does not possess the capability of quickly restoring frozen cooked foods to desired temperatures.

Accordingly, it is an important object of this invention to invite a prospective customer to purchase an edible which is displayed attractively for this purpose, providing ready access, while at the same time maintaining the edible in a heated condition.

Another important object of this invention is to provide a simple structure for attractively displaying edibles with increased capacity and ready access thereto for customers.

Still another object of this invention is to provide a self-service food warmer providing ready access to the customers while maintaining the edibles at elevated temperatures while conserving space and electricity.

It has been found that fixing end portions of vertically spaced elongated horizontal trays to vertical standards carried by a quick-recovery oven with electrical connections extending through the means fixing the end portions of the trays for supplying electrical energy to heating means within the trays achieves the results outlined above.

The construction designed to carry out the invention will be hereinafter described, together with other features thereof.

The invention will be more readily understood from a reading of the following specification and by reference to the accompanying drawings forming a part thereof, wherein an example of the invention is shown and wherein.

The drawings illustrate a self-service food warmer including a pair of horizontally spaced vertical standards A. A plurality of vertically spaced elongated horizontal trays B each have end and side portions carried between the standards. Means C are provided for fixing the end portions of the trays to said standards intermediate the side portions. Heating means D are carried within the trays for providing uniformly heated surfaces therefor. Electrical connections E extend through the means fixing the end portions of the trays for supplying electrical energy to the heating means. A horizontal substantially imperforate top F is spaced above the trays. Wall members G form a partial closure about said trays permitting free access to said trays therebetween. A quick-recovery oven H serves as a base for the food warmer, and a heated surface forms an upper wall for the oven and serves as a lower heating tray. A plurality of spaced lamps I are carried by the top and have directional beams radiating heat across the sides of said trays for avoiding heat loss.

The vertical standards A are constructed of sheet metal bent into elongated members having a rectangular configuration. These elongated members each include an inner wall 10 and a separate outer wall 11 contained within end members 12 and 13 integral with the inner walls 10. If desired, a stiffener member (not shown) may extend longitudinally within the standards, through the top and the oven to provide additional rigidity to the structure.

Figure 3:
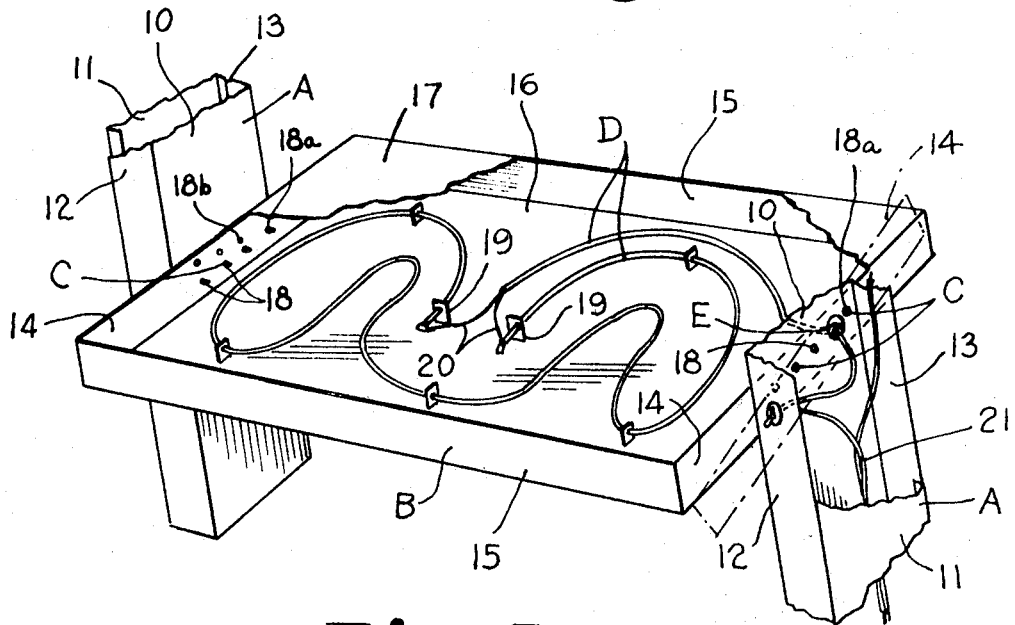
FIG. 3 is an enlarged perspective view illustrating a tray and mounting means therefor.

A plurality of vertically spaced elongated horizontal trays B have end portions 14 and side portions 15, as well as a bottom portion 16, and a top cover 17 constructed of sheet metal. Means C fix the end portions of said trays to the support means, or vertical standards A. The means C include adjacent portions of the end portions 14 and standards A, as well as fastening means in the form of screws 18. One of the screws 18a at each end of each tray serves as a pivot for said tray connecting each end of the trays and each standard. The screws 18 and 18a are illustrated as passing through openings in the adjacent portions of the ends 14 and the standards A. A plurality of additional openings 18b are aligned along a second or inclined plane so that the screws may be removed from the openings and placed in the second set of openings arranged along an inclined plane and the tray will assume a downwardly and forwardly extending position, as illustrated by broken lines in FIG. 3.

Heating means D are carried within said trays in the form of calrod units for providing uniformly heated surfaces for the trays. Each of the calrod units has a support 19 at each end thereof facilitating the attachment of electrical connections 20. Electrical connections E are made through the means C fixing the end portions of the trays for supplying electrical energy thereto. The means E includes a tubular fitting which passes through adjacent portions of the end members 14 and the standards A. These electrical connections are taken from the bundle of wires 21 which pass upwardly through the right-hand standard A.

A horizontal substantially imperforate top F is spaced above the trays and serves to prevent excessive heat loss through the upper portion of the assembly. The top is constructed of sheet metal and has sides 22 and end members 23, as well as a lower imperforate surface 24. The member 24 serves to support directional lamps or bulbs I. These lamps I are spaced so as to radiate heat across the sides of the trays, forming a heat barrier thereabout, and are preferably 150-watt, 120-volt, projector flood lamps manufactured by Westinghouse. The top G and the heated surface 25 serve as supports for wall members G which form a partial closure about the trays permitting free access to the trays therebetween. Auxiliary members in the form of U-shaped tracks 26 and 27 are carried by the heated surface 25 and the top F, respectively, for positioning the wall means G which are in the form of vertically disposed sections of glass. If desired, the wall members may be constructed of lateral extensions of the vertical standards A. The glass members define an opening or door at each side of the assembly for access to edible items carried on the trays B by customers.

It will be observed that the heated surface 25 forms an upper wall for the oven H, as well as a lower tray for the assembly. The oven H is of a quick-recovery type, wherein frozen food or edible items may be placed directly from the refrigerator for rapidly bringing them up to desired temperature. This temperature is maintained by the heating means within the trays B and within the heated surface 25. If desired, U-shaped track members (not shown) may be disposed at the rear of the machine assembly opposed to each other between the top F and the heated surface 25 for carrying a reflective back portion which would enhance the display effects should the unit be placed against a wall where customers could not serve themselves from both sides. If, due to air conditioning, in a particular location where adverse air currents are created, additional door means may be positioned across the front of the machine between the top and the heated surface 25 for closing the front of the machine, and these doors would require opening before the customer serves himself. In a situation where the unit is placed against a wall and the reflective cover is used it may be particularly desirable to tilt the trays forwardly and downwardly as mentioned above so as to enhance the display characteristics and self-service features.

Figure 1:
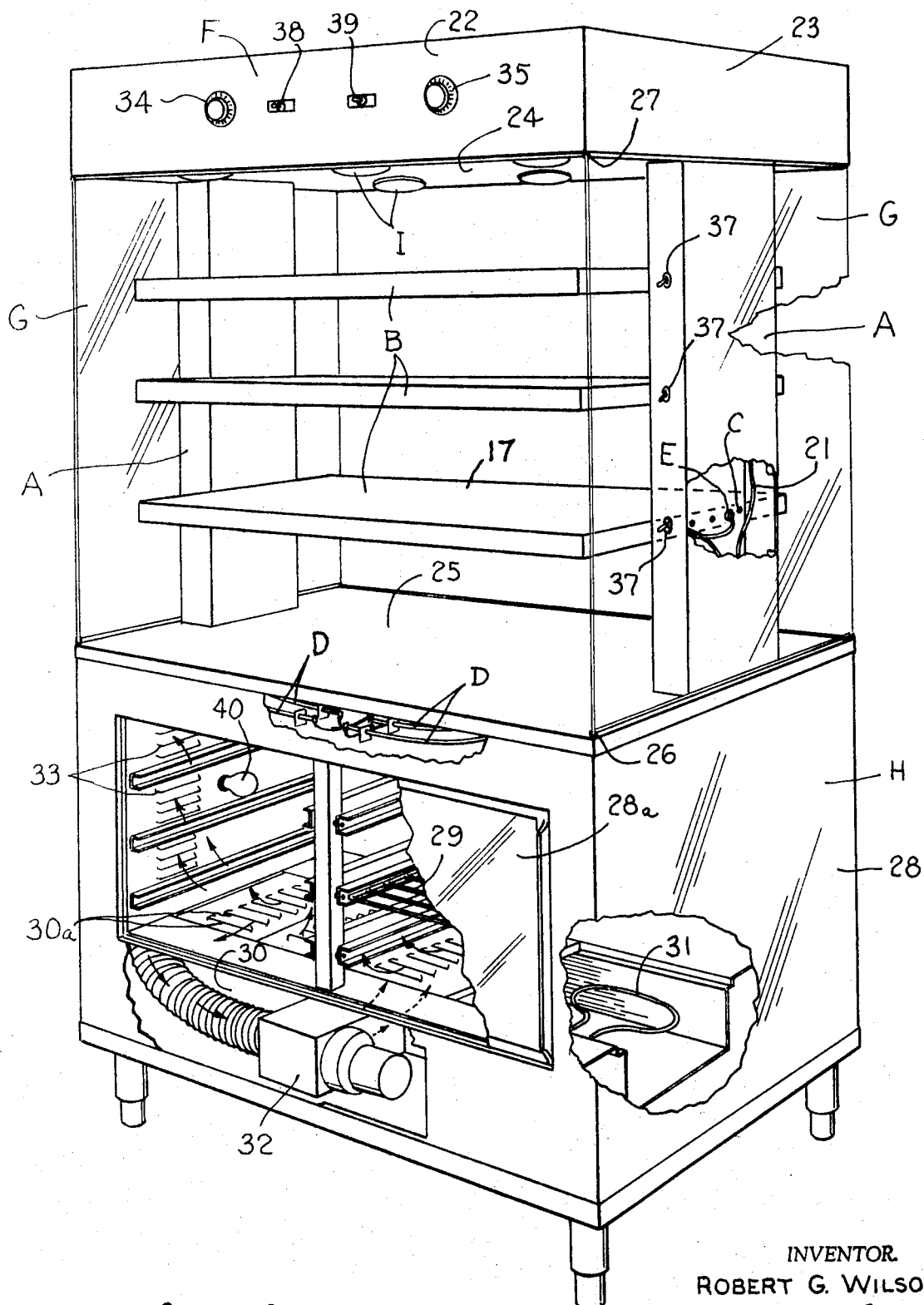
FIG. 1 is a perspective view illustrating a self-service food warmer constructed in accordance with the present invention, with parts broken away.

The oven H includes a lower housing 28 which carries sliding doors 28a for access thereto. The lower housing further includes vertically spaced intermediate trays 29 in each of the two side-by-side compartments illustrated in FIG. 1. The vertically spaced trays 29 support edibles carried within the lower housing. An enclosure 30 is carried within the lower housing having openings 30a therein. Electrical heating means 31 carried within said enclosure in a blower 30 is positioned within the lower housing discharging air from the lower housing through the openings 30a directly into the enclosure for heating the contents thereof. Discharge means 33 are carried by the enclosure directing heated air from the enclosure across the intermediate trays 29 and across the underside of the upper heated surface or tray 25 to at least partially heat the upper tray, as well as the intermediate trays.

Figure 2:
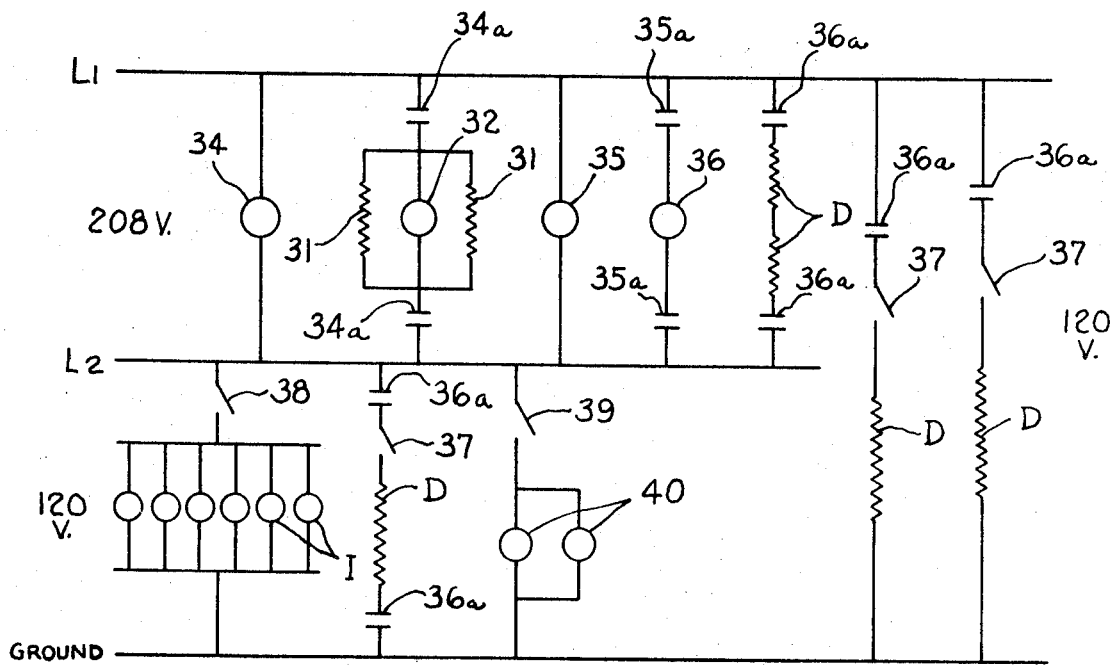
FIG. 2 is a circuit diagram illustrating the electrical components.

The circuit diagram of FIG. 2 illustrates the various electrical components connected across the lines L1 and L2 and ground, respectively. A thermostat 34 controls the temperature within the oven through its contacts 34a which, in turn, control the blower and the heating elements 31. A thermostat 35, through its contacts 35a, controls the relay coil 36 which, through its contacts 36a, controls the heating elements D within the shelves or trays B. It will be observed that toggle switches 37 are supplied as an additional control means for the heating of the upper trays B. The lamps I are controlled through the toggle switch 38 while the switch 39 controls the oven lights 40.

While a preferred embodiment of the invention has been described using specific terms, such description is for illustrative purposes only, and it is to be understood that changes and variations may be made without departing from the spirit or scope of the following claims.

What is claimed is:

1. A self-service food warmer comprising:
   A. a pair of horizontally spaced vertical standards;
   B. a plurality of edible supporting vertically spaced elongated horizontal trays having end and side portions carried between said standards;
   C. means fixing said end portions of said trays to said standards;
   D. heating means carried within said trays for providing uniformly heated surfaces therefor;
   E. electrical connections through said means fixing said end portions of said trays for supplying electrical energy to said heating means;
   F. a horizontal substantially imperforate top spaced above said trays;
   G. wall members forming a partial closure about said trays permitting free access to said trays therebetween;
   H. said wall members defining at least one open side extending across said food warmer permitting free access to all of said trays; and
   I. a plurality of spaced lamps carried by said top for radiating heat across sides of said trays forming a heat barrier thereabout.

2. The food warmer set forth in claim 1 including:
   A. a quick-recovery oven serving as a base for said food warmer; and
   B. a heated surface forming an upper wall for said oven serving as a lower heating tray.

3. The food warmer set forth in claim 1, wherein said means fixing said trays to said standards includes:
   A. a fastening serving as a pivot for said tray connecting each end of said trays and said standards;
   B. removable fastening means positionable in an alternate position for securing said trays to said standards for varying the inclination thereof.

4. A self-service food warmer assembly comprising:
   A. vertical support means;
   B. a plurality of edible supporting vertically spaced elongated horizontal trays having end and side portions carried by said support means;
   C. means fixing said trays to said support means;
   D. heating means carried within said trays for providing uniformly heated surfaces therefor;
   E. electrical connections through said means fixing said trays for supplying electrical energy to said heating means;
   F. a horizontal substantially imperforate top spaced above said trays;
   G. wall members forming a partial closure about said trays permitting free access to said trays;
   H. a quick-recovery oven serving as a base for said food warmer, and
   I. a heated surface forming an upper wall for said oven serving as a lower heating tray.

5. The assembly set forth in claim 4, wherein said oven includes:
   A. a lower housing;
   B. vertically spaced intermediate trays for supporting edibles carried within said lower housing;
   C. an enclosure within said lower housing having an opening therein;
   D. electrical heating means carried within said enclosure;
   E. a blower positioned within said lower housing discharging air from said lower housing through said opening directly into said enclosure for heating said air; and
   F. discharge means carried by said enclosure directing heated air from said enclosure across said intermediate trays.

* * * * *